Patented June 27, 1933

1,915,820

UNITED STATES PATENT OFFICE

WILLIAM ENGS AND RICHARD MORAVEC, OF BERKELEY, CALIFORNIA, ASSIGNORS TO SHELL DEVELOPMENT COMPANY, OF SAN FRANCISCO, CALIFORNIA, A CORPORATION OF DELAWARE

PRODUCTION OF ALKYL ACID ESTERS OF POLYBASIC INORGANIC ACIDS

No Drawing.   Application filed June 29, 1931.   Serial No. 547,782.

In one of our copending applications, we have described the continuous treatment of cracked petroleum fractions or the like, containing hydrocarbons of four or more carbon atoms to the molecule, with a selective absorbent to effect the segregation of tertiary-base olefines, that is to say, olefines containing a carbon atom with no hydrogen attached to it.

In another of our copending applications, we have described the utilization of these fractions, from which the highly reactive tertiary-base olefine content has first been removed, with relatively concentrated sulfuric acid to form the intermediate alkyl hydrogen sulfates in the preparation of secondary alcohols.

Now we have discovered that when these mineral oil fractions are agitated vigorously with acid, about 75% to 100% acid content, at temperatures below 80° F., preferably not above 60° F., the conditions are sufficient to cause reaction between the secondary-base olefine content (olefines capable of forming secondary alcohols by hydration) and the acid, yielding the corresponding alkyl acid esters and a small amount of polymers. The paraffin hydrocarbons present, containing the same number of carbon atoms per molecule as the olefines in the fraction are unattacked by the acid. Only sufficient acid is added to combine with the olefine content or a slight excess (about 10% excess); in some instances less than one mole of acid per mole of olefine may be used depending on the temperature and acid strength, the alkyl hydrogen sulfates, in the case of treatment of the mineral oil fractions with sulfuric acid, being miscible in the resulting acid solution and the solution, so formed, being immiscible with the paraffin hydrocarbons present. Mechanical separation of the two layers is easily effected in any manner as desired, as by centrifuging, siphoning or the like. The polymers present remain chiefly with the paraffin hydrocarbons. The saturated hydrocarbon layer containing the polymers may be utilized for blending with hydrocarbon fuel such as gasoline. Alternatively, when the fraction dealt with comprises a mixture of butane, butene and their isomers, or a similar mixture of normally gaseous hydrocarbons, the paraffin hydrocarbon content can be easily diminished by reducing the pressure on the system and permitting the unattacked normally gaseous paraffin hydrocarbons to evaporate.

Prior to our discovery, it has been customary to dilute the alkyl hydrogen sulfate obtained by a sulfation process with water to a predetermined aqueous content followed by immediate distillation. Such procedure is not conducive to high yields of secondary alcohols as we have ascertained that dialkyl sulfates are contemporaneously present with alkyl hydrogen sulfates. The former decompose readily and rapidly under ordinary distilling conditions to their original status and the resulting secondary-base olefines distill over with the secondary alcohols formed, requiring further separation and treatment of the secondary-base olefines.

We have found that if the alkyl hydrogen sulfate layer is first diluted at normal conditions with an aqueous medium, such as water, aqueous secondary alcohol and the like, and permitted to stratify, a small top layer consisting largely of dialkyl sulfate is formed which can be easily removed by any well known mechanical separation. The dilution is carried out at room temperature or slightly higher but preferably at or below room temperature as segregation and not hydrolysis is desired at this stage. The small amount of dialkyl sulfate obtained is either mixed with weak acid, aqueous or acid solutions of alcohols, preferably of secondary alcohols, an alkyl hydrogen sulfate solution or water (either in the presence or absence of a suitable emulsifying agent) and heated, whereby it is transformed to the corresponding secondary alcohol dissolved in weak sulfuric acid. The addition of weak acid or water is controlled by desired operating conditions. We have obtained excellent results when the acidity of dibutyl sulfate solution is adjusted to contain 15% $H_2SO_4$. An alternative procedure, and one which we prefer, is to treat the dialkyl sulfate with acid of about 60% to 100% strength, preferably with 60% to 85% strength acid, whereby the dialkyl sulfates are converted into alkyl hydrogen sulfates. The reactions proceed as follows:

$$R_2SO_4 + H_2SO_4 \rightarrow 2RHSO_4$$
$$R_2SO_4 + H_2O \rightarrow ROH + RHSO_4$$

wherein R represents an alkyl group. The alkyl acid esters thus obtained are contained in acid solutions which are adjusted to the desired acidity, determined by operating conditions. When resort is had to a butyl hydrogen sulfate solution, it is desirable to dilute the solution with an aqueous medium such as water until it contains approximately 15% $H_2SO_4$ although with other alkyl acid esters, the amount of water added will vary, depending on the particular operating conditions and character of the alkyl acid ester undergoing treatment. The solutions are introduced into an evaporator and distillation is employed to effect the removal of the resulting secondary alcohols from the acid present. The azeotropic mixture of alcohol and water is then treated in the customary manner to minimize the aqueous content of the constant boiling mixture.

Although we have described our process as applied to olefine-containing fractions from which highly reactive unsaturates as tertiary-base olefines have first been removed, our invention is not restricted thereto. Neither is it limited to a mixture of alkyl acid esters and polyalkyl esters from which the polyalkyl esters must first be removed as the invention may be practiced with any polyalkyl ester whether in the pure state or in admixture. The process is generic to any polyalkyl ester whether of sulfuric, phosphoric or other polybasic acid and is pertinent as a general mode of conversion of polyalkyl esters to the corresponding alcohols regardless of the carbon content of the alkyl groups. For example, in certain instances, one may find it desirable to treat mineral oil fractions containing secondary-base olefines, or substantially pure secondary-base olefines, or secondary-base olefines in admixture with other hydrocarbons first with a dibasic acid, as sulfuric acid, whereby the corresponding dialkyl sulfate is obtained. Then the neutral esters may be treated with the same acid or another polybasic acid, for instance a tribasic acid of the order of phosphoric acid, whereby the reaction may proceed in one of two ways:

(1) $R_2SO_4 + H_3PO_4 \rightarrow RHSO_4 + RH_2PO_4$
(2) $R_2SO_4 + 2H_3PO_4 \rightarrow 2RH_2PO_4 + H_2SO_4$ In reaction (2), the alkyl acid ester formed is not the one corresponding to the dialkyl ester treated while in reaction (1) the corresponding alkyl acid ester is formed. Under some circumstances, initial treatment of the above enumerated raw material with a tribasic acid, as phosphoric acid, will lead to the formation of $RH_2PO_4$, $R_2HPO_4$ and $R_3PO_4$. The latter two types of compounds may be treated with the same tribasic acid to obtain the corresponding alkyl acid esters or they may be treated with other polybasic acids to yield alkyl acid esters as illustrated by the following reactions:

(1) $R_2HPO_4 + H_3PO_4 \rightarrow 2RH_2PO_4$
(2) $R_2HPO_4 + H_2SO_4 \rightarrow RH_2PO_4 + RHSO_4$
(3) $R_3PO_4 + H_3PO_4 \rightarrow RH_2PO_4 + R_2HPO_4$
(4) $R_3PO_4 + H_2SO_4 \rightarrow RHSO_4 + R_2HPO_4$ If desired, the dialkyl acid esters obtained in reactions (3) and (4) can be converted to monoalkyl acid esters according to reactions (1) and (2) by appropriate treatment with excess acid so as to drive the reaction to completion in the desired direction. The alkyl acid phosphates and similar alkyl acid esters may be worked up into the corresponding alcohols in a manner similar to that expressed with alkyl acid sulfates; slight variations in the acidity of the solutions of the acid esters to be hydrolyzed being expected due to different operating conditions.

As an alternative procedure, we have found that the polyalkyl esters may be converted to alkyl acid esters while the former are in solution in alkyl acid esters without first separating the two components of the solution. The aqueous acid solution may be treated with the proper acid which will disturb the equilibrium between the alkyl acid ester and the polyalkyl ester with further production of the former from the latter. The acidity of the solution now containing an increased alkyl acid ester content is adjusted in the manner heretofore described. Upon distilling, there is obtained higher yields of the corresponding secondary alcohols from the alkyl acid esters heretofore available.

Although the mode of operation is not dependent upon the physical state of the reactants, it is preferable to execute the same in a liquid system, as greater surface contact is thereby afforded.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:
1. The process of converting a polyalkyl ester of a polybasic inorganic acid to an alkyl acid ester of a polybasic inorganic acid, comprising substantially converting the polyalkyl ester of a polybasic inorganic acid to an alkyl acid ester of a polybasic inorganic acid by reaction with a polybasic inorganic acid of a strength not less than 60%.

2. The process of converting a dialkyl ester of a polybasic inorganic acid to an alkyl acid ester of a polybasic inorganic acid, comprising substantially converting the dialkyl ester of a polybasic inorganic acid to an alkyl acid ester of a polybasic inorganic acid by reaction with a polybasic inorganic acid of a strength not less than 60%.

3. The process of converting a dialkyl sulfate to an alkyl acid sulfate comprising substantially converting the dialkyl sulfate to its corresponding alkyl hydrogen sulfate by reaction with sulfuric acid of a strength not less than 60%.

4. The process of converting an ester of the type

wherein R represents an alkyl group containing four or more carbon atoms and A represents an acid radical of a polybasic inorganic acid, to alkyl acid ester of a polybasic inorganic acid comprising substantially converting the dialkyl ester of a polybasic inorganic acid to an alkyl acid ester of a polybasic inorganic acid by reaction with a polybasic inorganic acid of a strength not less than 60%.

5. The process of converting an ester of the type

wherein R represents an alkyl group containing four or more carbon atoms, to an alkyl hydrogen sulfate comprising substantially converting the dialkyl sulfate to its corresponding alkyl hydrogen sulfate by reaction with sulfuric acid of a strength not less than 60%.

6. The process of converting dibutyl sulfate to butyl hydrogen sulfate comprising substantially converting the dibutyl sulfate to butyl hydrogen sulfate by reaction with sulfuric acid of a strength not less than 60%.

7. In a process for the preparation of secondary alcohols from olefines present in a fraction obtained from mineral oil from which tertiary-base olefines have been preliminarily removed, the steps of sulfating the secondary-base olefines present in the fraction by admixing said fraction with sulfuric acid while maintaining an acid concentration and a temperature at which sulfation of said secondary-base olefines takes place, diluting the acid solution with an aqueous medium, effecting the stratification of the diluted acid solution, removing the layer containing the dialkyl sulfates, and substantially converting the dialkyl sulfates to monoalkyl acid esters by reaction with a polybasic inorganic acid.

8. In a process for the preparation of secondary alcohols from olefines present in a fraction obtained from mineral oil from which tertiary-base olefines have been preliminarily removed, the steps of sulfating the secondary-base olefines present in the fraction by admixing said fraction with sulfuric acid while maintaining an acid concentration and a temperature at which sulfation of said secondary-base olefines takes place, separating the resulting alkyl hydrogen sulfate solution from the unattacked paraffin hydrocarbons, diluting the acid solution with an aqueous medium, effecting the stratification of the diluted acid solution, removing the layer containing the dialkyl sulfates, and substantially converting the dialkyl sulfates to the corresponding alkyl hydrogen sulfates by reaction with sulfuric acid.

9. In a process for the preparation of secondary alcohols from olefines present in a fraction obtained from mineral oil and predominantly consisting of hydrocarbons containing not less than four carbon atoms to the molecule from which tertiary-base olefines have been preliminarily removed, the steps of sulfating the secondary-base olefines present in the fraction by admixing said fraction with sulfuric acid while maintaining an acid concentration and a temperature at which sulfation of said secondary-base olefines takes place, separating the resulting alkyl hydrogen sulfates from the unattacked paraffin hydrocarbons, diluting the acid solution with an aqueous medium, effecting the stratification of the diluted acid solution, removing the layer containing the dialkyl sulfates, and substantially converting the dialkyl sulfates to the corresponding alkyl hydrogen sulfates by reaction with sulfuric acid.

10. In a process for the preparation of secondary alcohols from olefines present in a fraction obtained from mineral oil and predominantly consisting of hydrocarbons containing four carbon atoms to the molecule from which isobutylene has been preliminarily removed, the steps of sulfating the butenes present in the fraction by admixing said fraction with sulfuric acid while maintaining an acid concentration and a temperature at which sulfation of said butenes takes place, separating the resulting butyl hydrogen sulfate solution from the unattacked butane, diluting the acid solution with an aqueous medium, effecting the stratification of the diluted acid solution, removing the layer containing dibutyl sulfate, and substantially converting the dibutyl sulfate to butyl hydrogen sulfate by reaction with sulfuric acid.

11. In a process for producing valuable products from polyalkyl esters of polybasic inorganic acids, the step of reacting a mixture of alkyl acid esters and polyalkyl esters of polybasic inorganic acids with a polybasic inorganic acid of a strength not less than 60% and at a temperature at which substantial conversion of the polyalkyl esters of polybasic inorganic acids to alkyl acid esters of polybasic inorganic acids is effected.

12. In a process for producing valuable products from polyalkyl esters of polybasic inorganic acids, the step of reacting a mixture of alkyl acid esters and dialkyl esters of polybasic inorganic acids with a polybasic inorganic acid of a strength not less than 60% and at a temperature at which substantial conversion of dialkyl esters of polybasic inorganic acids to alkyl acid esters of polybasic inorganic acids is effected.

13. In a process for producing valuable products from polyalkyl esters of polybasic inorganic acids the step of reacting a mixture of alkyl hydrogen sulfates and dialkyl sulfates with sulfuric acid of a strength not less than 60% and at a temperature at which substantial conversion of the dialkyl sulfates to the corresponding alkyl hydrogen sulfates is effected.

14. In a process for producing valuable products from polyalkyl esters of polybasic inorganic acids the steps of diluting a mixture of alkyl hydrogen sulfates and dialkyl sulfates with an aqueous medium, effecting the stratification of the diluted acid solution, removing and treating the layer containing the dialkyl sulfates with a polybasic inorganic acid of a strength and at a temperature at which substantial conversion of the dialkyl sulfates to alkyl acid esters is effected.

15. The process of converting a secondary polyalkyl ester of a polybasic inorganic acid to a secondary alkyl acid ester of a polybasic inorganic acid comprising substantially converting said secondary polyalkyl ester to a secondary alkyl acid ester of a polybasic inorganic acid by reaction with a polybasic inorganic acid of a strength not less than 60%.

In testimony whereof, we have hereunto set our hands.

WILLIAM ENGS.
RICHARD MORAVEC.